United States Patent [19]
Fotta

[11] Patent Number: 6,130,937
[45] Date of Patent: Oct. 10, 2000

[54] SYSTEM AND PROCESS FOR AUTOMATIC STORAGE, ENFORCEMENT AND OVERRIDE OF CONSUMER DO-NOT-CALL REQUESTS

[75] Inventor: Keith Alan Fotta, Duxbury, Mass.

[73] Assignee: TeleMark Technology, Inc., Boston, Mass.

[21] Appl. No.: 08/853,563

[22] Filed: May 8, 1997

[51] Int. Cl.[7] .................................................. H04M 1/677
[52] U.S. Cl. ........................ 379/200; 379/188; 379/196
[58] Field of Search .................................. 379/188, 196, 379/197, 198, 199, 200, 201, 207, 210, 211, 212, 213

[56] References Cited

U.S. PATENT DOCUMENTS

| | | | |
|---|---|---|---|
| 3,786,196 | 1/1974 | Gresham | 179/18 |
| 3,793,487 | 2/1974 | Kilby | 379/74 |
| 4,277,649 | 7/1981 | Sheinbein | 379/201 |
| 4,277,651 | 7/1981 | Fischer, II et al. . | |
| 4,278,844 | 7/1981 | Jones | 379/157 |
| 4,306,295 | 12/1981 | Caroc | 364/761 |
| 4,348,555 | 9/1982 | Basle | 179/90 |
| 4,438,555 | 3/1984 | Tsumuki et al. | 29/505 |
| 4,683,583 | 7/1987 | Kossor | 379/200 |
| 4,788,682 | 11/1988 | Vij et al. | 370/110.1 |

(List continued on next page.)

FOREIGN PATENT DOCUMENTS

| | | |
|---|---|---|
| 0 438 860 | 7/1991 | European Pat. Off. . |
| 0 510 411 B1 | 10/1992 | European Pat. Off. . |
| 0 564 192 A2 | 10/1993 | European Pat. Off. . |
| 0 588 101 A2 | 3/1994 | European Pat. Off. . |
| 0 653 868 | 2/1995 | European Pat. Off. . |
| WO 96/06413 A1 | 2/1996 | WIPO . |

OTHER PUBLICATIONS

FCC's Report and Order for the Telephone Consumer Protection Act of 1991 (TCPA), Updated Apr. 5, 1998, ® Russell Smith, http://consumer.net/randostmt.asp, printed Jul. 29, 1998.

Junkbusters: U.S. laws concerning telemarketing, Aug. 26, 1996, Copyright ® 1996 Junkbusters Corp, http://www.junkbusters.com/ht/en/fcc–64.html, printed Jul. 29, 1998.

Cold Calling Rules and Procedures; Copyright 1995 by Mark J. Astarita, Esq., http://www.seclaw.com/coldcall.htm printed Jul. 29, 1998.

Report Card On Compliance With The Telephone Consumer Protection Act of 1991 By Top Retail Firms In The Securities Industry and Self–Regulatory Organizations, updated Jan. 10, 1997, http://www.russ–smith.com/rptcard2a.htm, printed Jan. 13, 1997.

Paper entitled: Service Maintenance and Testing Strategy for Advanced Intelligent Network, authors: Omayma E. Moharram and Donald Coombs, published Feb. 14, 1994® 1994 IEEE, pp. 609–622.

*Primary Examiner*—Krista Zele
*Assistant Examiner*—Roland G. Foster
*Attorney, Agent, or Firm*—Wolf, Greenfield & Sacks, P.C.

[57] ABSTRACT

A system and process for automatic storage, enforcement and override of consumer do-not-call (DNC) requests includes a control device for selectively blocking communication between a communication device and a destination over a communication medium. The control device is connected to the communication medium and to a database for storing identifiers of destinations for which communication is to be blocked. The communication device has an input mechanism responsive to a user to generate an identifier of the destination. The input mechanism is also responsive to an update signal indicating that the identifier should be added to the database or an override signal indicating that the blocked call should in fact, be permitted, thereby overriding the blocking mechanism. The communication device is automatically updated with information stored in the database which may be used by the communication device to process further communication.

9 Claims, 16 Drawing Sheets

U.S. PATENT DOCUMENTS

| | | | |
|---|---|---|---|
| 4,799,255 | 1/1989 | Billinger et al. | 379/189 |
| 4,924,510 | 5/1990 | Le | 379/221 |
| 4,930,152 | 5/1990 | Miller . | |
| 4,993,062 | 2/1991 | Dula et al. | 379/88 |
| 5,062,103 | 10/1991 | Davidson et al. | 370/58.1 |
| 5,070,525 | 12/1991 | Szlam et al. | 379/196 |
| 5,109,408 | 4/1992 | Greenspan et al. | 379/197 |
| 5,206,900 | 4/1993 | Callele . | |
| 5,216,709 | 6/1993 | Wen et al. | 379/354 |
| 5,315,647 | 5/1994 | Araujo | 379/265 |
| 5,341,414 | 8/1994 | Popke . | |
| 5,345,595 | 9/1994 | Johnson et al. | 455/33.1 |
| 5,351,289 | 9/1994 | Logsdon et al. | 379/142 |
| 5,361,295 | 11/1994 | Solomon et al. . | |
| 5,390,243 | 2/1995 | Casselman et al. | 379/265 |
| 5,436,957 | 7/1995 | McConnell | 379/88 |
| 5,467,388 | 11/1995 | Redd, Jr. et al. | 379/196 |
| 5,469,497 | 11/1995 | Pierce et al. | 379/115 |
| 5,473,671 | 12/1995 | Partridge, III | 455/445 |
| 5,485,370 | 1/1996 | Moss et al. | 395/200.47 |
| 5,495,521 | 2/1996 | Rangachar | 379/93.04 |
| 5,515,425 | 5/1996 | Penzias et al. | 379/114 |
| 5,519,769 | 5/1996 | Weinberger et al. | 379/112 |
| 5,533,103 | 7/1996 | Peavey et al. | 379/69 |
| 5,537,533 | 7/1996 | Staheli et al. | 395/182.03 |
| 5,559,867 | 9/1996 | Langsenkamp et al. . | |
| 5,566,234 | 10/1996 | Reed et al. | 379/188 |
| 5,586,179 | 12/1996 | Stent et al. | 379/265 |
| 5,590,171 | 12/1996 | Howe et al. . | |
| 5,638,430 | 6/1997 | Hogan et al. . | |
| 5,651,053 | 7/1997 | Mitchell . | |
| 5,668,860 | 9/1997 | Andruska et al. | 379/196 |
| 5,724,408 | 3/1998 | Morganstein | 379/88.2 |
| 5,751,800 | 5/1998 | Ardon | 379/134 |
| 5,757,899 | 5/1998 | Boulware et al. | 379/196 |
| 5,802,157 | 9/1998 | Clarke et al. | 379/196 |
| 5,887,058 | 3/1999 | Kammath et al. . | |
| 5,898,770 | 4/1999 | Valentine . | |
| 5,930,764 | 7/1999 | Melchione et al. . | | great # SYSTEM AND PROCESS FOR AUTOMATIC STORAGE, ENFORCEMENT AND OVERRIDE OF CONSUMER DO-NOT-CALL REQUESTS

FIELD OF THE INVENTION

The present invention is related to telephone and software systems and processes which inhibit telephonic communications to a particular telephone number or other identified destination. More particularly, the present invention is related to systems and processes for automatic update and override of telephone numbers with which communication is to be inhibited.

BACKGROUND OF THE INVENTION

Most telephone systems are capable of preventing telephone connections from being established according to the telephone number dialed. Such systems are provided by a telephone service provider and typically are used to block telephone calls that would incur a fee, such as long distances calls or numbers having a "1-900" or "1-976" prefix. See for example, U.S. Pat. Nos. 3,786,196 and 5,109,408.

Recently, federal, state and industry-imposed telephone solicitation laws and regulations mandate that a consumer, who expresses a desire not to be solicited by telephone, not be called. By regulation, a list must be maintained by each company and is commonly called a "do-not-call" list. In order to comply with these laws and regulations, most companies have instituted a procedure whereby a telephone solicitor prepares a memo listing the telephone numbers for which consumers have indicated a desire not be solicited. These numbers eventually are provided to the telephone service provider of the company. The telephone service provider programs the central office (e.g. 40 in FIG. 3) associated with the company's office to prevent telephone calls to the listed telephone numbers from phones within the company. Other individual offices in the company are not prevented from calling numbers on the "do-not-call" list unless the telephone service provider programs each individual number in each central office associated with each office of the company.

One problem with this methodology is that the ability to add a number to a set of prohibited numbers requires a significant amount of manual effort, which is fraught with error, delay, and requires the telephone service provider to do the programming. It also is difficult to override the blocking system without repeating the entire process in reverse. For example, a personal or other acceptable business call to a number would be completely blocked because the number is on the "do-not-call" list.

SUMMARY OF THE INVENTION

The limitations of these systems are overcome with the system in an embodiment of the present invention by allowing numbers to be added automatically to a list of prohibited numbers governing all offices of the company and for inhibited numbers to be temporarily overridden using the same communication device that makes a telephone call. This system and process eliminates the intermediate list maintenance, distribution and intervention by the telephone service provider.

Accordingly, one aspect of the invention is a control device for selectively inhibiting communication between a communication device and a destination over a network. The communication device is connected to the network by a communication medium and has an input mechanism which is operative in response to a user to generate an identifier of the destination. This identifier is sent over the communication medium to the network to initiate communication with the destination. The input mechanism of the communication device is operative in response to a user to generate an update signal sent over the communication medium and indicating that communication with the destination corresponding to a most recently sent identifier should be inhibited. The control device is connected to the communication medium and a database to store identifiers for destinations and indicative of destinations for which communication is to be inhibited. In such a control device, the presence of the identifier on the communication medium is detected. The identifier is compared to identifiers in the database. Communication may be inhibited between the communication device and the destination based on the comparison made with the database. Presence of the update signal on the communication medium is detected and the database is modified according to the most recently sent identifier when the signal is detected.

Another embodiment of the present invention is a control device or process for selectively permitting communication between a communication device and a destination over a network. The communication device has an input mechanism which is operative in response to a user to generate an identifier of the destination. This identifier is sent over the communication medium to the network to initiate communication with the destination. The communication device, has an input mechanism which is operative in response to a user to generate an override signal sent over the communication medium and indicating that communication with the destination corresponding to a most recently sent identifier should be permitted. The control device is connected to the communication medium and a database to store identifiers for destinations and indicative of destinations for which communication is to be inhibited. In this embodiment, the presence of the identifier on the communication medium is detected. The identifier is compared to identifiers in the database. Communication between the communication device and the destination may be temporarily inhibited based on the comparison made with the database. If the override signal is detected on the communication medium after communication has been inhibited, then communication between the communication device and the destination is permitted. The override signal may be stored in the database. It is probable that the communication inhibiting tone or message will be heard by the caller before a connection is made to the called party.

The communication device in the present invention may include a computer, a telephone, or any other communication mechanism. The identifier of a destination may include a telephone number or a computer network address. The identifier in the present invention may be detected in an analog or digital environment at a voice frequency or at a carrier frequency.

The communication inhibited in the present invention may include voice transmissions and data transmissions. The communication may be inhibited by overlaying a tone or voice message or generating a software command over the communication medium or any combination thereof.

The communication medium in the present invention may include an analog or digital communication format and the network may be circuit or packet switched.

The database in the present invention may include an object-oriented or relational database or a flat file. The database may be accessed using read and write commands or a query language, such as SQL. The database in the present invention may be automatically updated and may be used to automatically update the communication device.

The database in the present invention may include a plurality of network databases. An override or update signal or identifiers for destinations may be stored in a local database. The plurality of network databases may be periodically updated with information in the local database.

DETAILED DESCRIPTION

The present invention will be more completely understood through the following detailed description which should be read in conjunction with the attached drawings in which similar reference numbers indicate similar structures.

Figure 1:
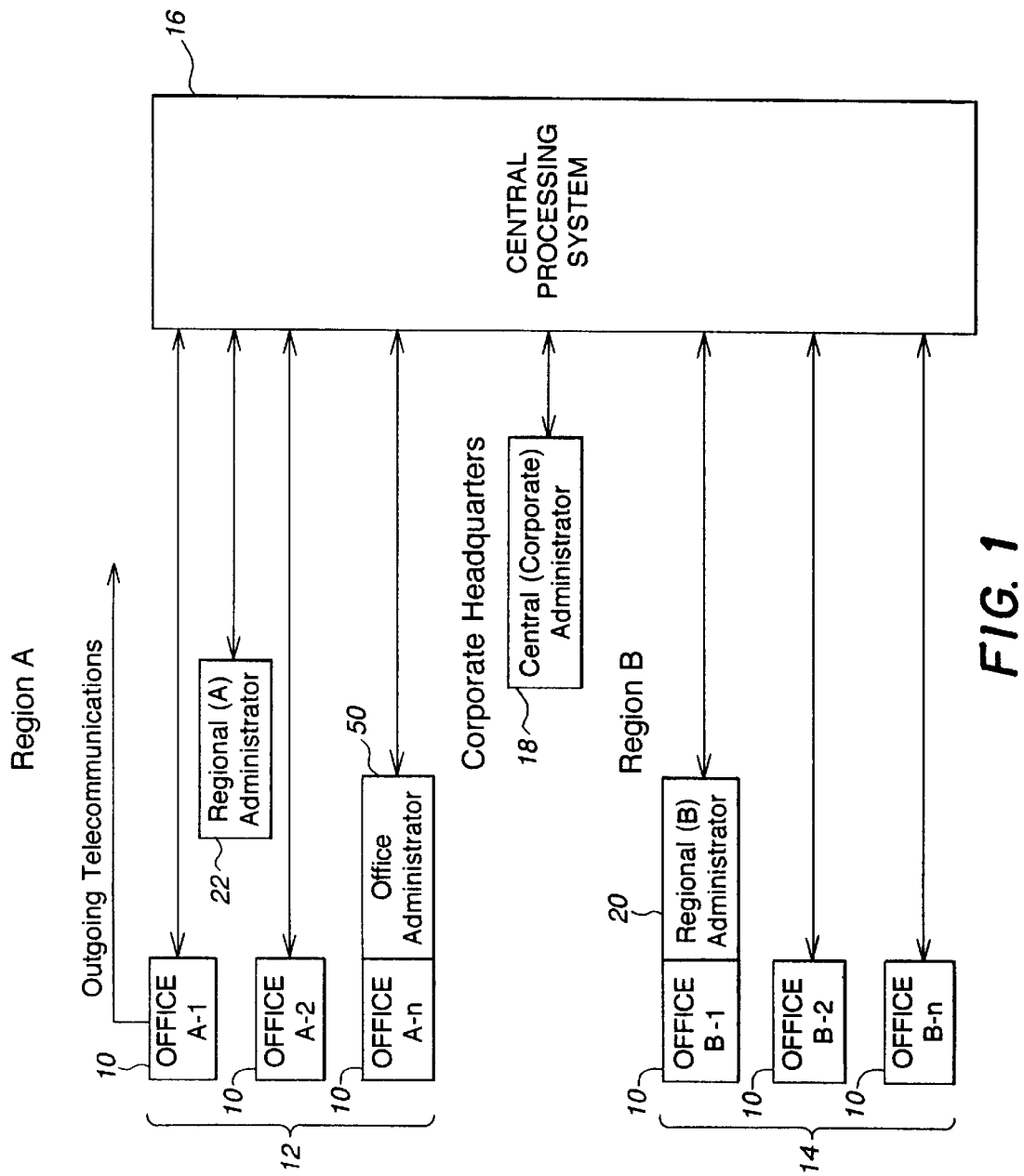
FIG. 1 is a block diagram of a system in one embodiment of the invention, in which offices are connected to a central processing system with a central master database.

Referring now to FIG. 1, one embodiment of the present invention will now be described. This embodiment is designed for use with several offices 10 belonging to one entity. The offices 10 may be grouped together into regions such as indicated at 12 and 14. Each office 10 has an office control unit 48 (FIG. 3) or 70 (FIGS. 5A and 5B) to be described in more detail below, which monitors outgoing calls and commands from individual communication devices, such as telephone units, within that office 10. As described in more detail below, each office 10 has its own local database containing Do-Not-Call (DNC) phone numbers. A single office 10 may have its own local administrator system 50. The administrator 50 may be used, for example, to access the database to generate reports detailing DNC database activity. Each office 10 is also connected to a central processing system 16 which may have its own central administrator system 18, which maintains a central master database of DNC phone numbers for the entire entity. The central processing system 16 automatically updates each office control unit, and therefore each office 10, with information stored in the central master database. An administrator system provides basic capabilities for managing the database and will be described in more detail below in connection with FIGS. 1–15. Each region (e.g. A or B) may also have its own regional administrator system, such as indicated at 20 and 22.

Figure 2:
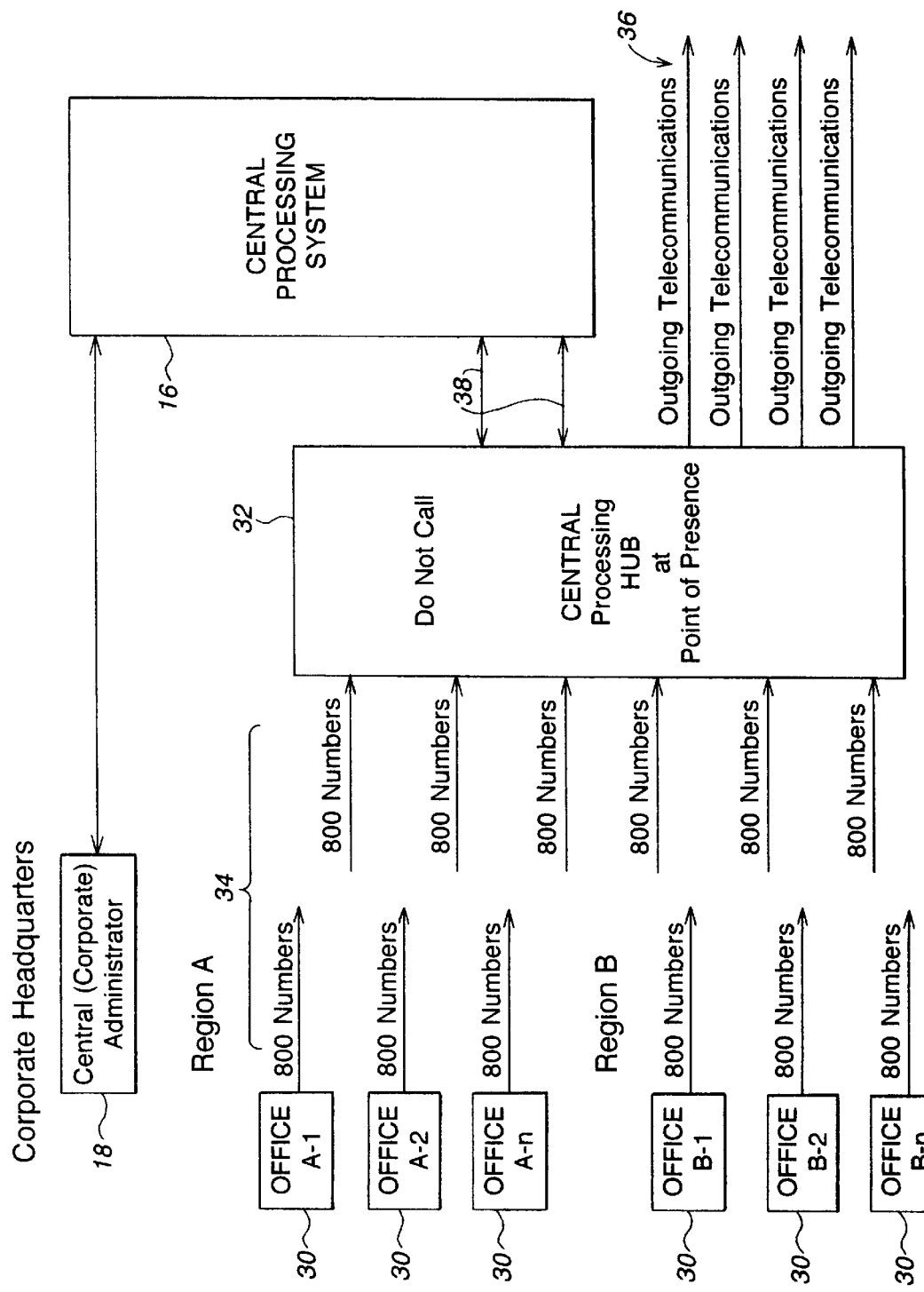
FIG. 2 is a block diagram of a system in another embodiment of the invention, in which offices connect to a central processing hub at a point of presence, which connects to a central processing system with a central master database.

Referring now to FIG. 2, another embodiment of the invention will now be described. This embodiment is particularly useful for an office 30, which is similar to office 10, except that office 30 does not have a sufficient number of communication devices for originating telephone calls to warrant the use of a local office control unit 48 (described in more detail below in FIG. 4). In this instance, an office 30 contacts a central processing hub 32 via telephone, cellular or any other network 34, for example by using a "1-800" number. The central processing hub 32 includes a control unit, as described below in connection with FIG. 4, and a local database. The office 30 makes the connection with the central processing hub 32 and enables a communication device at office 30 to initiate further outgoing telephone calls as indicated at 36. The central processing hub 32 is connected to the central processing system 16 via a computer network 38 to enable entity wide or corporate wide administration of the DNC database. Combinations of the embodiments shown in FIGS. 1 and 2 are also possible.

Figure 3:
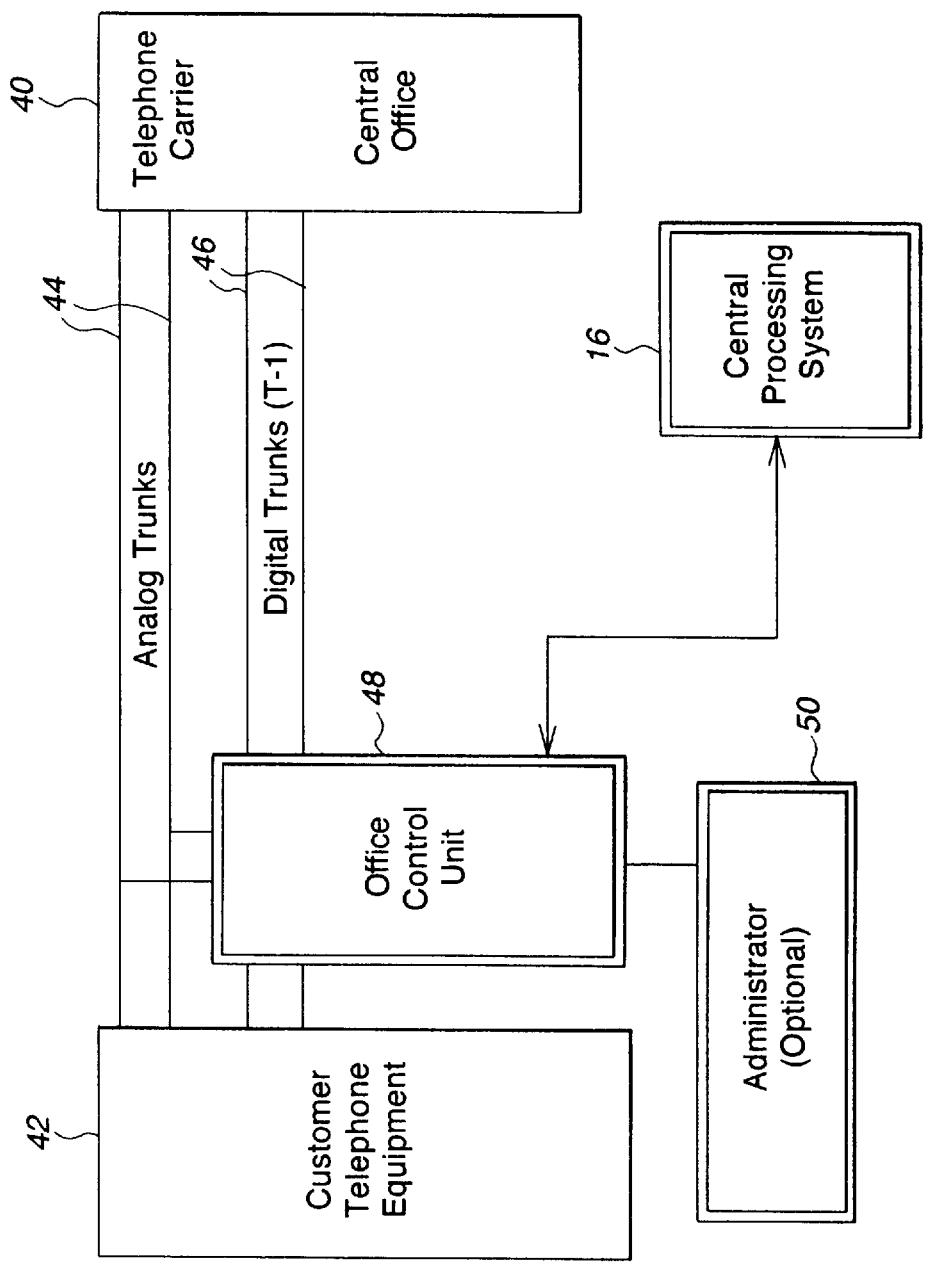
FIG. 3 is a block diagram of a telephone system for an office with an office control unit according to one embodiment of the invention.

Referring now to FIG. 3, an embodiment of the present invention will now be described in which a local office 10 has connections called trunk lines between a customer's telephone equipment 42 and a central office 40. An office control unit 48 for each office 10 in the embodiment shown in FIG. 1 and the central processing hub 32 as shown in FIG. 2, have connections to the central processing system as indicated at 16. An office 10 typically has telephone equipment 42 through which several communication devices, primarily telephones but possibly computer systems, are connected to a telecommunications carrier or other computer network via either analog trunks 44 or digital trunks 46. The telephone equipment 42 may include a private branch exchange (PBX), a key system or an automatic call distributor (ACD). The telecommunications carrier may be packet switched or circuit switched. The digital trunks may be T1, ISDN, ADSL or other type of digital communication medium. An office control unit 48 either bridges the analog trunks 44 or is placed between the telephone equipment 42 and telecommunications carrier 40 on the digital trunks 46. The office control units 48 are described in more detail below in connection with FIGS. 4 through 15.

The office control unit 48 monitors the signals on the lines 44 and 46 to detect 1) destination identification, such as dialed telephone numbers, 2) a signal indicating that an identifier, such as a telephone number, should be added to a DNC database and 3) a signal indicating that an inhibited call should be overridden. The office control unit 48 also detects the origin of each call and monitors the date and time of day. The office control unit 48 maintains a local database, described in more detail below in which indication of at least inhibited calls, added identifiers, and overrides is stored. The database also may track all telecommunications activity. The administrator system 50 also may be provided and connected to the office control unit 48 for providing various database management and report generation facilities, as will be described in more detail below.

Figure 4:
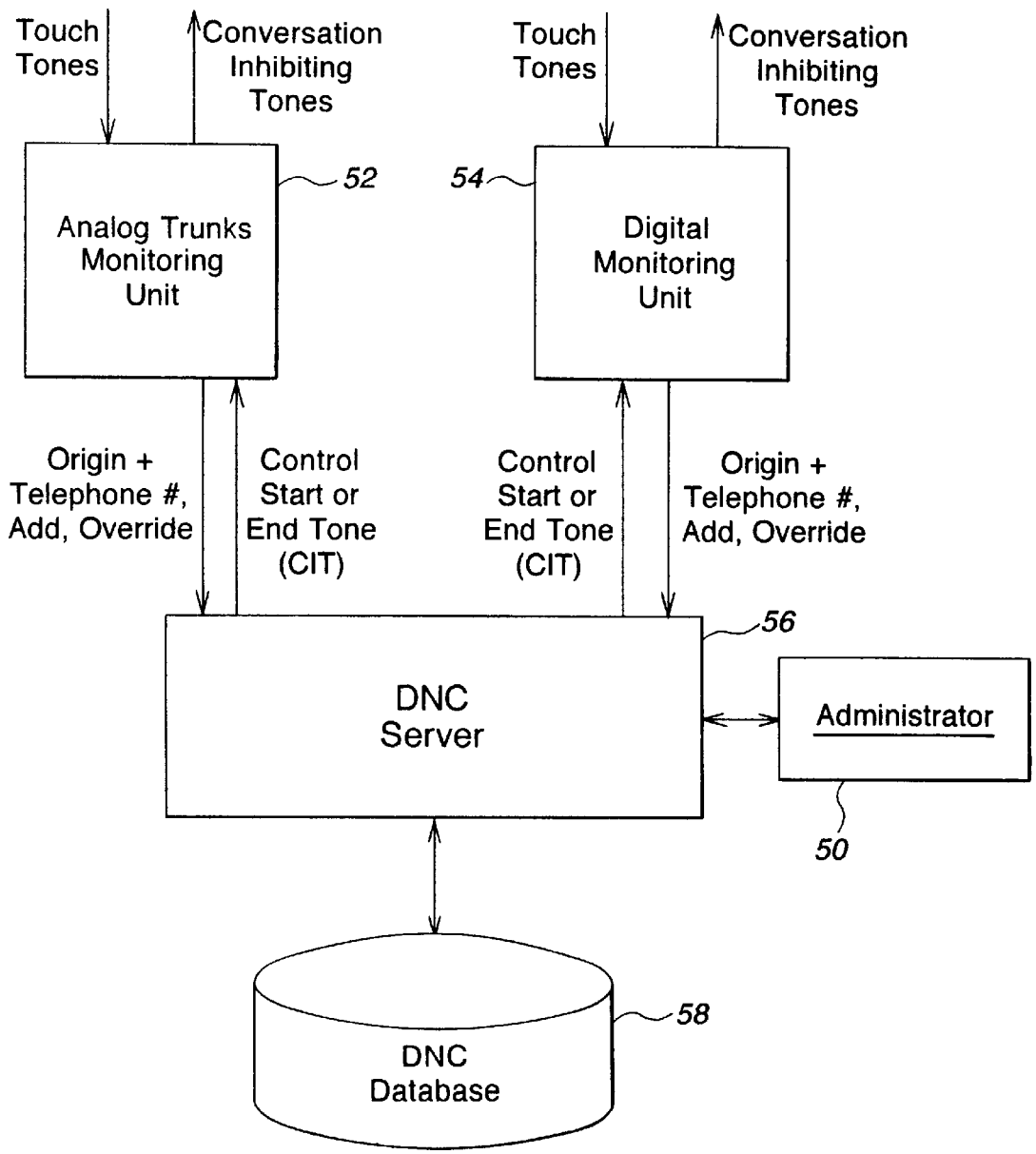
FIG. 4 is a block diagram illustrating more details of one embodiment of the office control unit.

Referring now to FIG. 4, the office control unit 48 will be described in more detail. The office control unit 48 typically includes an analog monitoring unit 52 and/or a digital monitoring unit 54. Each of the monitoring units monitors an input mechanism, such as a keypad. The monitoring unit detects signals (e.g. touch tones) from the input mechanism, present on the communication medium, such as a telephone line. The monitoring units 52, 54 output an indication of an origin of a signal, the identifier of the destination, such as a dialed telephone number, and other signals, for example, signals indicating either to add an identifier to the DNC list or to temporarily override a DNC identifier. In addition, in response to control instructions from the DNC server 56, each generates a conversation inhibiting tone (CIT) or a voice message on the line to which it is connected. Alternatively, the monitoring units 52, 54 may be used actually to block communication, such as a telephone call, rather than place a CIT or voice message on the line. The DNC server 56 monitors the information received from the monitoring units 52 and 54 to access the database 58 to either generate a CIT or voice message, override a CIT or voice message, or update the database. The administrator system 50 also accesses the database 58 through the DNC server 56. The database may be implemented using a relational database, flat files or binary files.

Figure 5A:
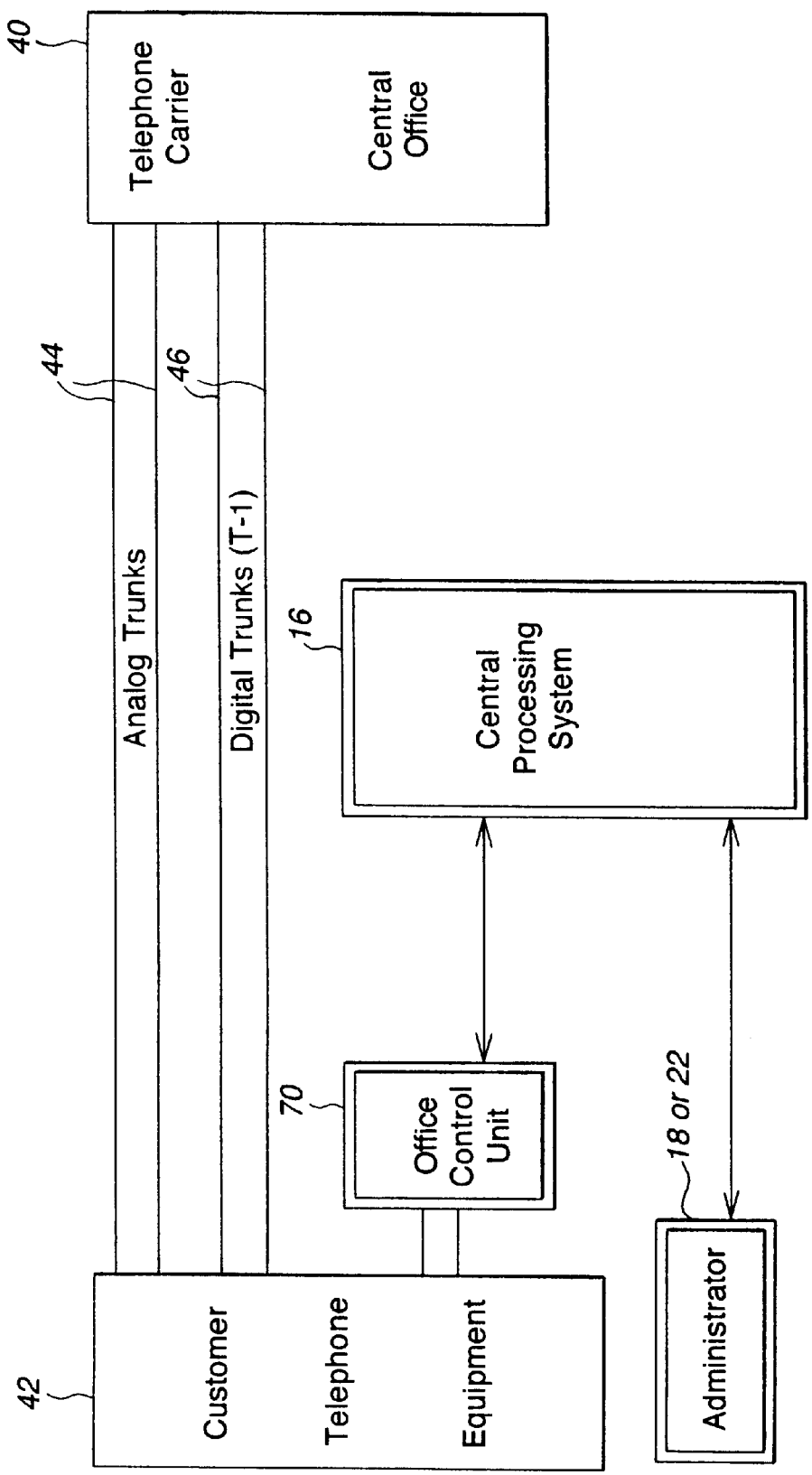
FIG. 5A is a block diagram illustrating an alternative embodiment of the present invention which includes a Computer Telephony Integration (CTI) solution and on-site server for an office control unit.

Another embodiment of the present invention is shown in FIG. 5A. In this embodiment, an administrator 50 is not used since the office control unit 48 as discussed above is replaced by an office control unit 70 which includes a computer telephony integration (CTI) interface linked to an on-site server. The telecommunications carrier 40 is connected to the telephone equipment 42 through analog 44 and/or digital trunks 46. The office control unit 70 however, is connected directly to the telephone equipment 42 and to the central processing system 16 which in turn, is connected to the administrator 18 or 22. The office control unit 70 includes the CTI interface and on-site server using Microsoft's Telephony Application Interface (TAPI™) or Novell's Telephony Services Application Programming Interface (TSAPI™). This alternative system also uses a Multi Vendor Integration Protocol (MVIP™) standard network bus interface which is a multiplexed digital telephony communication medium designed to carry telecommunications traffic between circuit boards within an industrial class PC chassis. TAPI combines telephony technology with PC technologies. Microsoft's TAPI™ is an Application Programmer's Interface (API) which provides standard CTI call control in the Windows development environment. Novell's TSAPI™ is an Application Programmer's Interface (API) which provides standard Computer Supported Telephony Application (CSTA) call control in the NetWare™ development environment. The API enables existing LAN based applications to be extended to incorporate telephony capabilities. In this embodiment, an office control unit may detect calls made, i.e., instructions sent, via this API in order to monitor outgoing calls rather than by monitoring signals on the actual trunk lines.

Figure 5B:
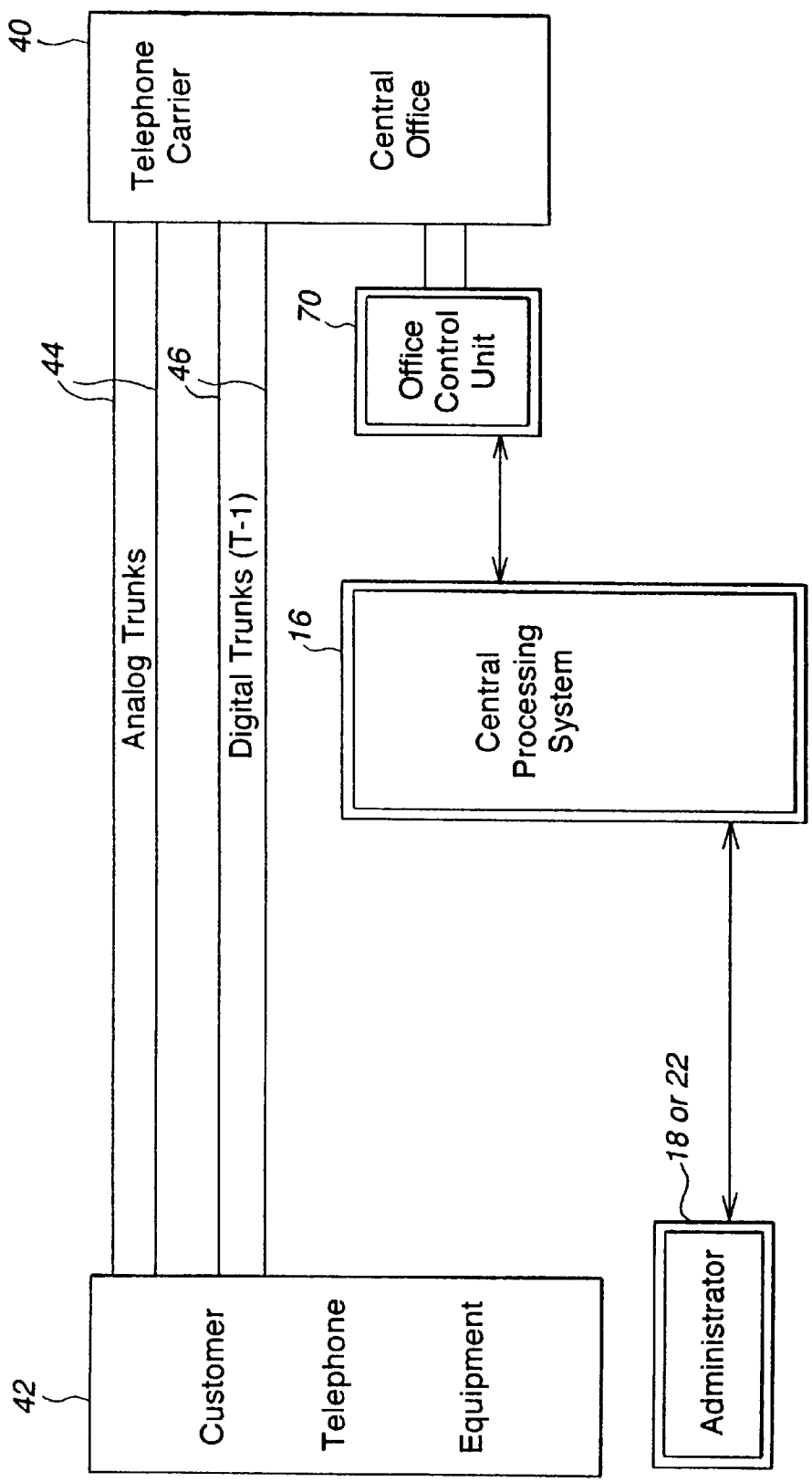
FIG. 5B is a block diagram illustrating an alternative embodiment of the present invention which includes an alternative CTI solution and connection for an office control unit.

FIG. 5B illustrates another embodiment of the present invention. The architecture and functionality of this embodiment is similar to the embodiment described above in connection with FIG. 5A. However, as shown in FIG. 5B, the office control unit 70 is connected directly to the central office 40. In this embodiment, the office control unit 70 operates in an environment including Intelligent Networks (IN) and Advanced Intelligent Networks (AIN) and may communicate with office 10 through the CTI and API interfaces as discussed above. Having now described two interface embodiments (FIGS. 5A, 5B) of the present invention, it should be apparent to one skilled in the art that there are numerous other means and interfaces with which to implement such a general operation.

Turning now to FIG. 4, an embodiment of the DNC server 56 in one embodiment of the present invention, corresponding to embodiments in FIGS. 1–4 and particular to a telephone communication device, will now be described. An overview of the process performed by the DNC server 56 in FIG. 4 for each call initiated by a communication device and monitored by the DNC server 56 will be described in connection with FIG. 6. When a particular communication device is placed "off hook," and receives a dial tone, this condition is detected, and the monitoring process of the office control unit is initiated. The DNC server 56 waits for a number to be dialed as indicated in step 100. The DNC server 56 then receives the number in step 102 from the analog monitoring unit 52 or digital monitoring unit 54. The DNC server 56 updates a database 58 with the date, time and origin of call in step 103. In step 104, the database 58 is searched to determine if the number received by the DNC server 56 exists in the database 58. If a received number is found in the database 58, thereby indicating it is a DNC number in step 106, a CIT, voice message or software command is initiated in step 118 by issuing the appropriate command to the monitoring unit 52 or 54. The information that such a tone was generated can be stored in the database 58 as indicated in step 120. Once a command to issue a CIT voice message or software command is initiated, in step 118, it is possible to override the command. If an override signal is received in step 122, the CIT or voice message is removed using an appropriate command to the monitoring device in step 126. The call is allowed to be connected, in step 130. The fact that an override command was received is then recorded in the database 58 in step 128. If an override is not received, or an override is recorded in the database 58, the DNC server 56 then waits for the call to end in step 124. If the number dialed is not a DNC number as determined in step 106, the DNC server 56 waits for an update signal until it receives an on hook signal as indicated in step 108. If an update signal is received, the DNC server 56 adds the dialed number to the database 58 in step 110, and in step 111, acknowledges receipt of the signal to the originator, for example, by generating a brief audio tone. The number is added to the database 58 in step 112 and the DNC server 56 waits for an on hook signal and ends processing in step 114. If a command to add the number to the database 58 is not received, then the call continues in step 113 until the end of the call in step 114.

Figure 7:
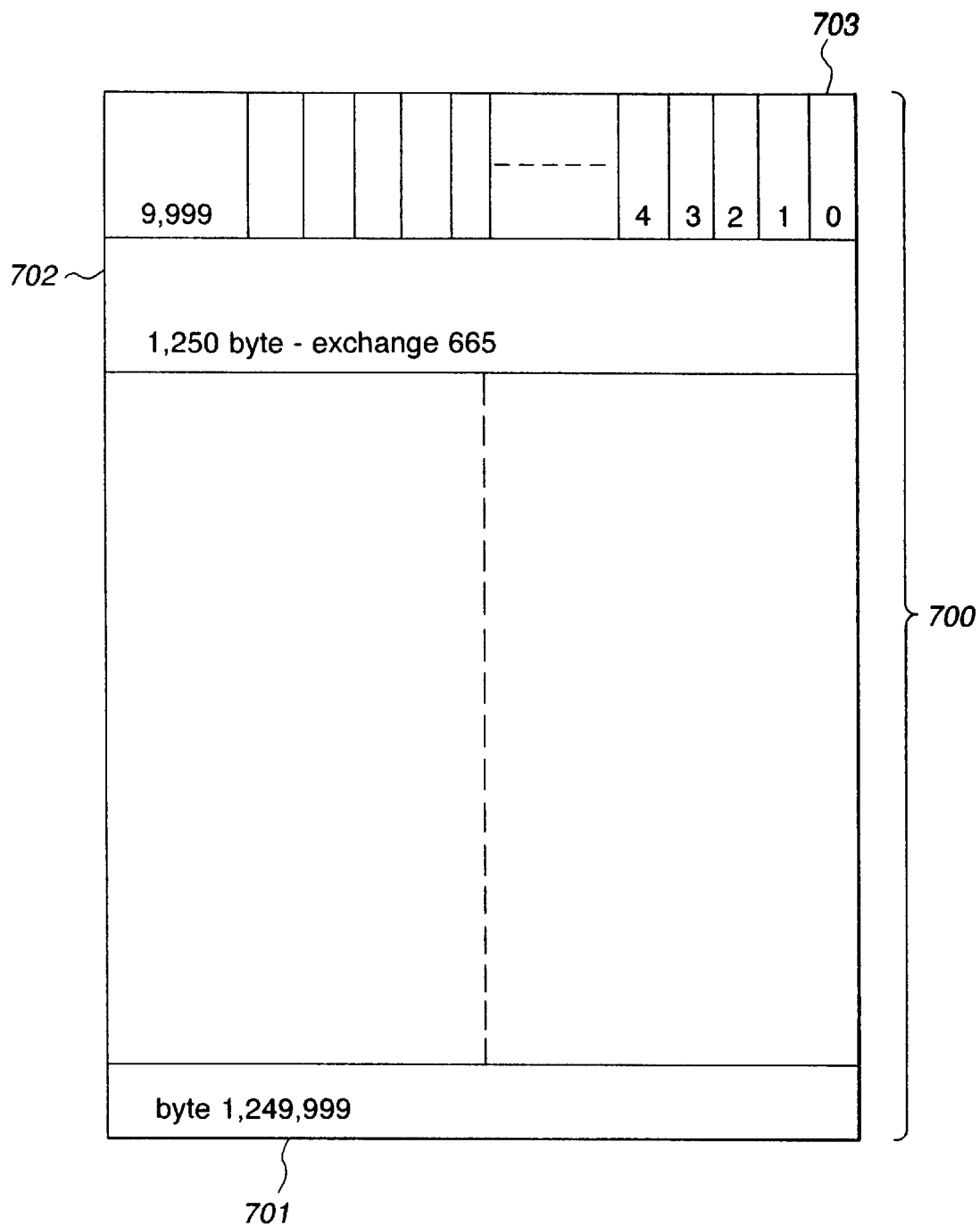
FIG. 7 is a diagram of a sample file containing Do-Not-Call (DNC) phone numbers.

Referring now to FIG. 7, an illustration of a sample file containing DNC identifiers, in particular, telephone numbers will be described. The DNC numbers, in this embodiment of the present invention, are stored in binary bit map files. This is only one possible implementation of such a database.

Other database structures, such as a relational or an object-oriented database, may be used. The database may be accessed using simple file read and write commands or by a database query language, such as SQL. In this embodiment of the present invention, there is a bit map file, for example bit map file 700, for every area code that has DNC numbers. All bit map files 700 are 1,250,000 bytes in size as shown in 701. Each exchange within the area code is allocated a 1,250 byte block as shown in 702, which contains 10,000 bits as shown in 703. These bits 703 are mapped to the last four digits of the phone number 0000–9999.

Figure 6:
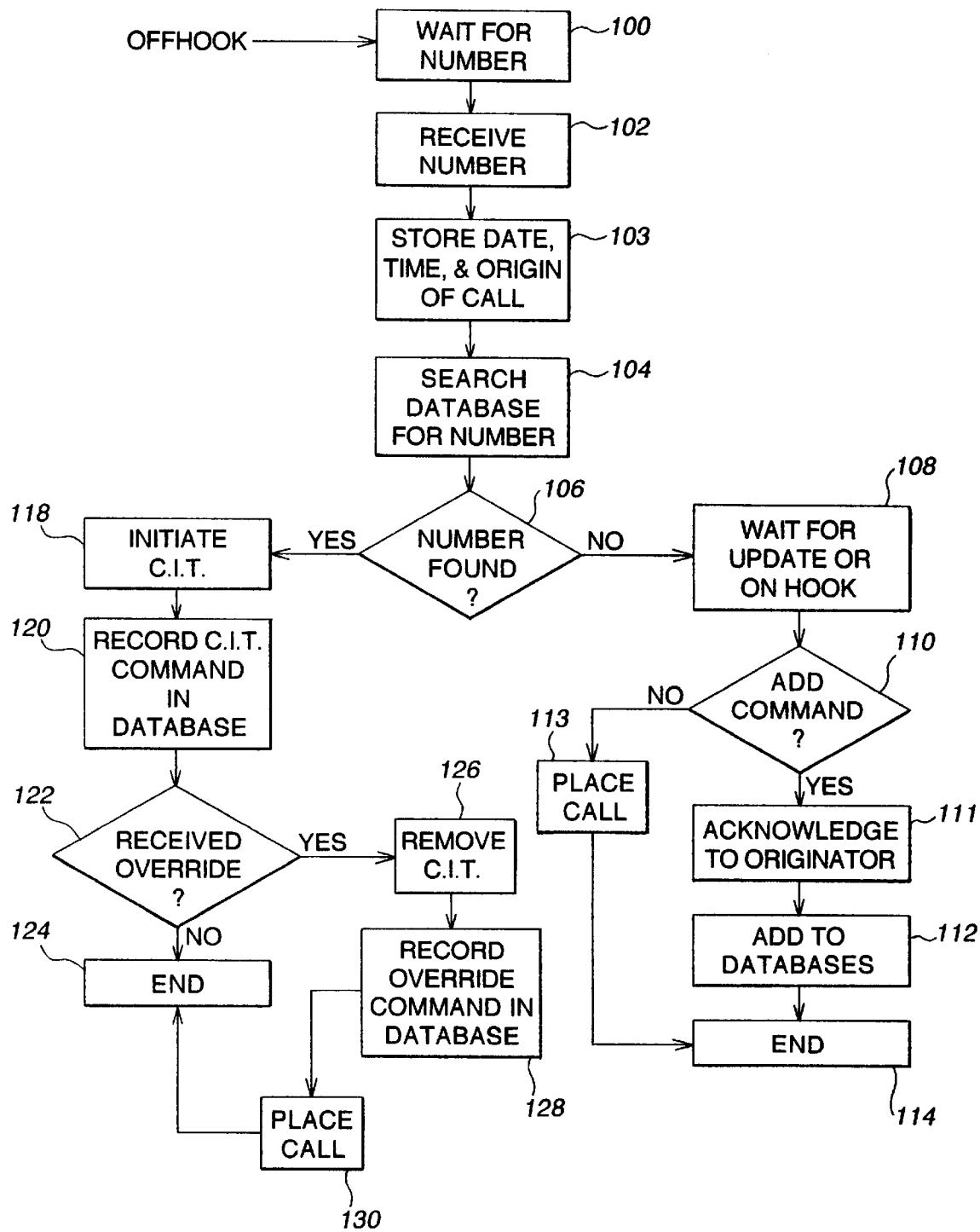
FIG. 6 is a flowchart describing how the office control unit processes each call on each line initiated by a communication device associated with the lines monitored by the server.
Figure 8:
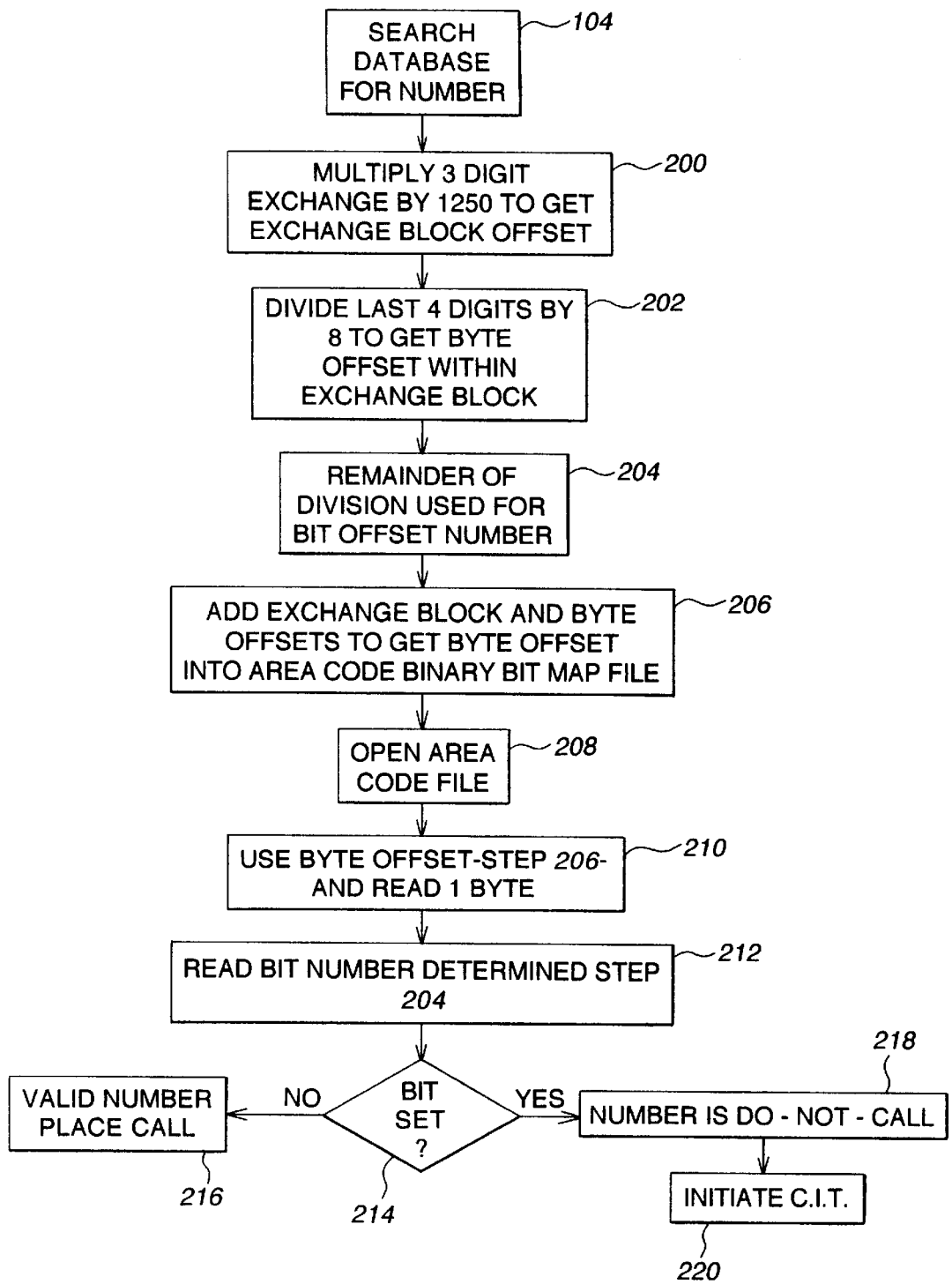
FIG. 8 is a flowchart describing how a database is searched for a DNC number.

The system of one embodiment of the present invention uses the process as shown in FIG. 8 to map bits 703 from the bit map file 700 to a telephone number. In step 104, the process begins with searching the database 58 for the dialed number. In step 200, the three digit phone exchange number is multiplied by 1250 to determine the phone number exchange block offset in bytes. Then, in step 202, the last four digits of the dialed number is divided by eight to determine the byte offset within the phone number exchange block. These two offsets are added together in step 206 to determine a byte offset into the area code binary bit map file of the byte that contains the bit for the telephone number. The remainder from the above division is used in step 204 to identify the bit offset into the byte for the telephone number. The area code file 700 is opened in step 208 and in step 210, the byte offset from step 206 is used to find the corresponding exchange block 702. The bit offset determined in step 204 is used to identify the bit number 703 in the exchange block byte which is read in step 212. If the bit is not set in 214, (the bit is zero) then the looked up number is not a DNC number and the call is permitted in step 216. If the bit is set in step 214, (the bit is one) then the looked up number is determined to be a DNC number in step 218. A CIT tone is initiated in step 220. The process may then continue as shown in FIG. 6.

The following table represents an example of how the process in FIG. 8 may work:

Sample Number Dialed Number: 617 665-1997

Step 200: 665 * 1250=831250 is exchange block offset;

Step 202: 1997/8=249, remainder 5;

Step 204: Remainder 5 is a bit offset;

Step 206: 831250+249=831499 is byte offset into area code file;

Step 208: Open file 617;

Step 210: Go to byte offset 831499, and read 1 byte;

Step 212: Read bit 5 (remainder);

Step 216: If bit 5=0, then the dialed number is a valid phone number; and Step 218: If bit 5=1, then the dialed number is a DNC phone number.

Table 1

Figure 9:
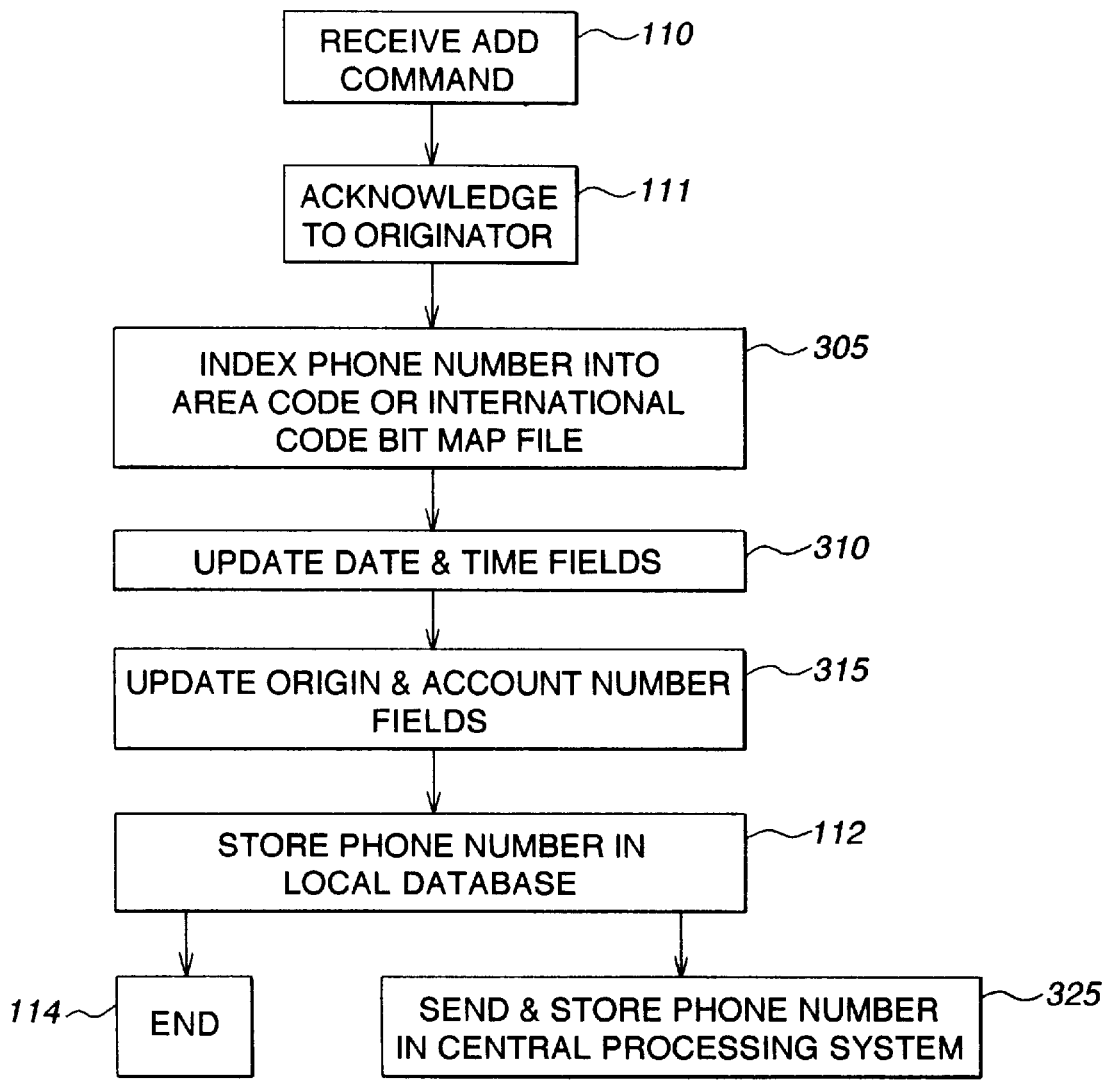
FIG. 9 is a flowchart describing how a DNC number is added to the database in one embodiment of the invention.

Referring now to FIG. 9, the process of adding an identifier to a database, which in this particular embodiment is a telephone number, will now be described. A user presses a button, for example, the button labeled with a "*" on the telephone keypad, to indicate that the dialed number of the currently active call is to be added to the database. The add command is received from the input mechanism in step 110 and an acknowledgment of receipt of the signal is sent to the originator of the call in step 111. In response to detection of this signal, the database 58 is searched for a matching area code or international code file in step 305. Using the same format and equivalent procedure as detailed above, the phone number is then indexed into the database 58 in the corresponding file and the date and time fields are updated for the number being added to the database in step 310. Also, the origin of the command to add the number to the database is recorded and a corresponding account number is recorded in step 315. The phone number is stored in the local database in step 112. The stored number is then sent to the central processing system 16 where the number is stored in step 325. This step may be performed for each number or for all numbers at a specified time each day, for example. The process to add the number to the database ends in step 114.

Figure 10:
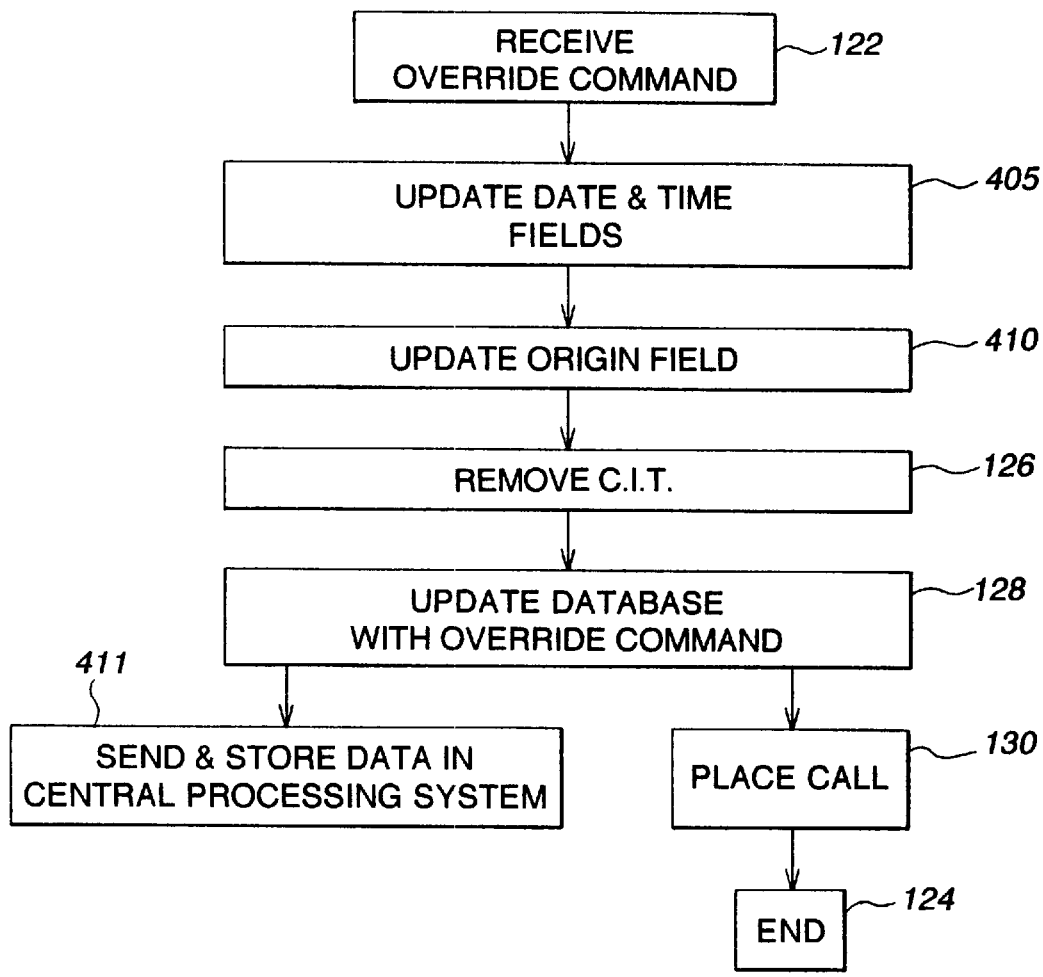
FIG. 10 is a flowchart describing how inhibited communication with a DNC number is overridden in one embodiment of the invention.

Referring now to FIG. 10, the process of how an override is recorded in the database will now be described. Continuing to use the embodiment which includes a telephone number as a destination identifier, the user presses a button, for example, the button labeled with a "#" on the telephone keypad, to send the command to override the CIT or voice message on the line. The override command is received from the input mechanism in step 122. The date and time fields corresponding to the dialed number are updated in step 405. Also, in step 410, the origin of the command signal is stored with the corresponding dialed number. The CIT or voice message is removed in step 126 and the call is allowed to continue. The database file corresponding to the dialed number is accessed according to the above procedure, and the file is updated to indicate that an override command was received and executed in step 128. The call proceeds without interruption in step 130. Information about the override is sent to and stored in the central processing system 16 in step 411. The process to record an override in a database ends in step 124.

Having now described the general operation of one embodiment of the present invention, it should be apparent to one skilled in the art that there are numerous other ways to implement such a general operation. A more detailed description of an embodiment of an office control unit, an example analog monitoring unit, an example digital monitoring unit, and an administrator will now be described.

Figure 11:
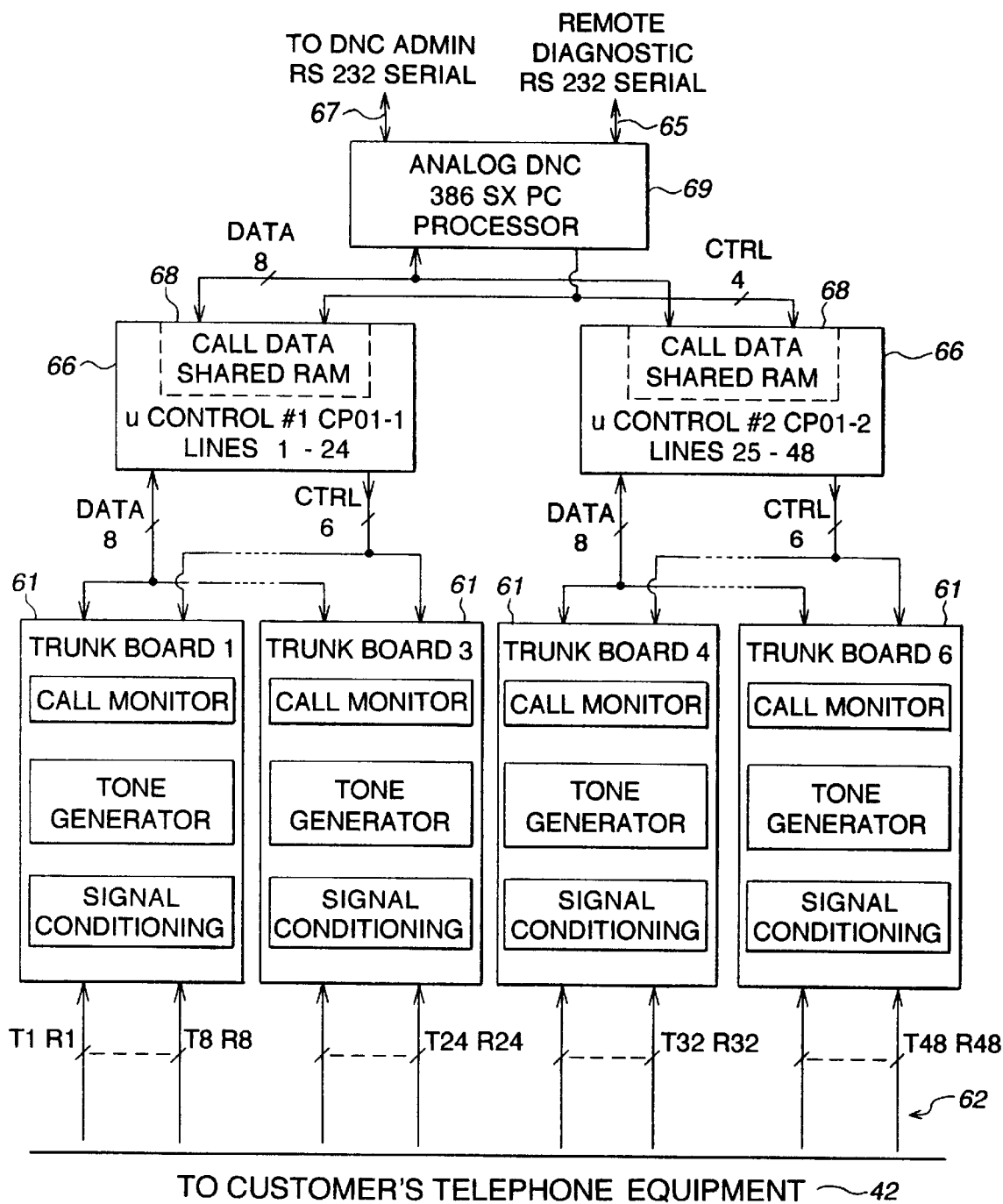
FIG. 11 is a block diagram illustrating more detail of an analog monitoring unit.

The analog monitoring unit 52 of the office control unit 48, which is connected to the customer's telephone equipment 42 will now be described in more detail in connection with FIG. 11. In this particular embodiment, a telephone communication and a telephone number identifier are used in the description of the function of the analog monitoring unit 52. The analog monitoring unit 52 includes a plurality of trunk boards 61 connected to trunk lines 62, which are analog lines. The trunk boards 61, described in more detail below in connection with FIG. 12, include a call monitor which detects each call on the line to enable touch tones to be detected. In addition, the trunk boards 61 include a tone generator 76 (FIG. 12) which applies a conversation inhibiting tone to the line.

In order to ensure nonblocking, simultaneous call monitoring of up to 48 telephone calls for DNC alerting, the analog monitoring unit 52 utilizes three processors. Each of the first two processors, microcontrollers 66, is assigned to 24 trunk lines 62. The 8-bit microcontrollers 66 detect touch tones and store them in memory 68. The mnicrocontrollers 66 scan the trunk boards 61 for off/on hook status of each trunk line 62 by receiving 8 data bits and 6 control bits from the trunk boards 61. The microcontrollers 66 open or close a call record in shared RAM 68 for each call. The microcontrollers 66 scan each trunk line 62 for dialed numbers and post the dialed numbers in the call record for each day. Also, the microcontrollers 66 scan call records for valid dialed numbers and post the status in the record if it is a valid number, or close the record if it is not a valid number. Each microcontroller 66 scans call records for DNC status responses from the DNC server 56 and applies a CIT or voice message to the line if the call is to a DNC number. In addition, the microcontrollers 66 scan call records for a "#" or "*" signal, indicating to override a CIT or voice message, or add or override a phone number from the DNC database.

Microprocessor 69 is an embedded PC processor which reads the numbers from the memory 68 in response to microcontrollers 66 to transmit the data to the DNC server 56 (FIG. 4), e.g., using a serial bus 67. The unit 52 also may have a remote diagnostic port, as indicated at 65. This microprocessor 69 receives a command from the DNC server 56 for inhibited calls, and causes the appropriate trunk board 61 to generate a CIT or voice message which is switched onto the call line. Microprocessor 69 off loads DNC system interface and DNC analog equipment diagnostics tasks to send and/or receive call record status and send completed dialed numbers to the DNC system. Microprocessor 69 also scans call records in RAM 68 of each microcontroller 66 and updates statuses. Microprocessor 69 may also provide diagnostic information via a call-in modem port.

Figure 12:
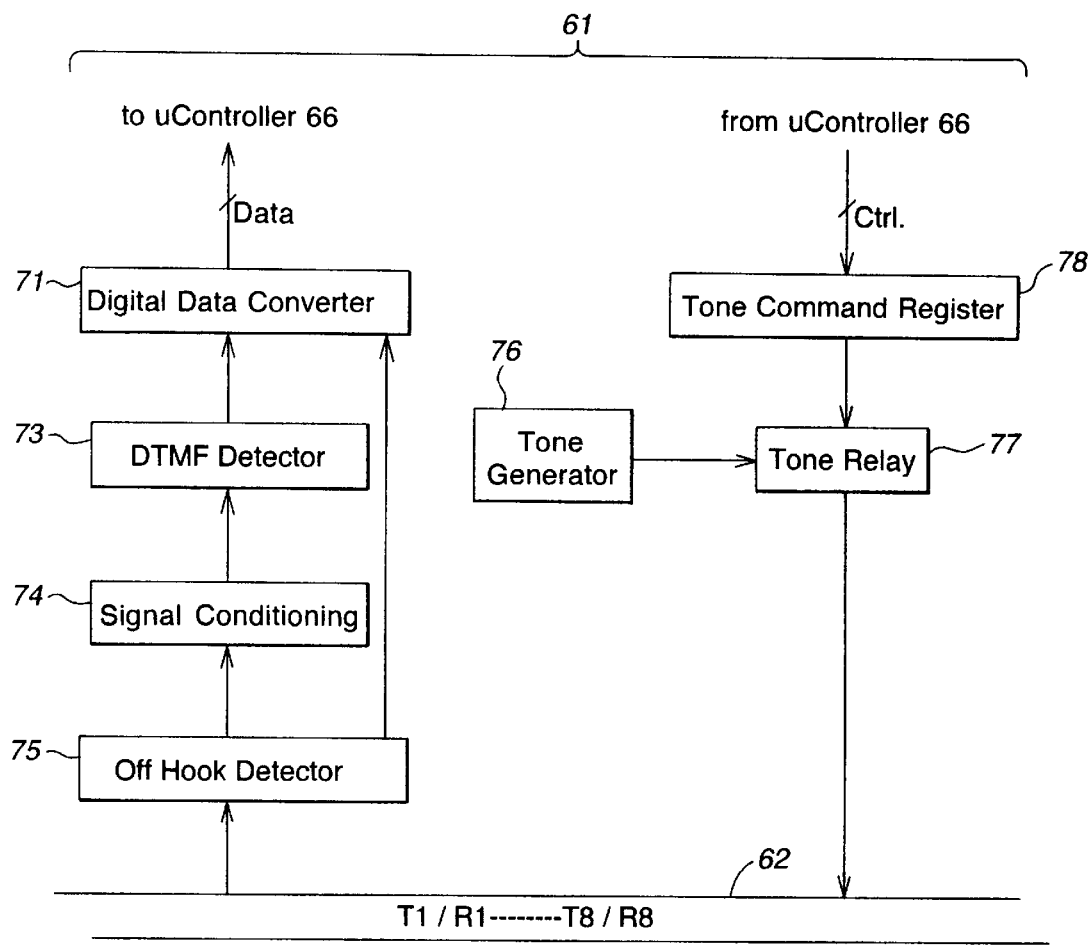
FIG. 12 is a block diagram illustrating more detail of a trunk board used in the analog monitoring unit.

One example embodiment of one of the trunk boards 61 used in the analog monitoring unit 52 is shown in FIG. 12. The trunk board 61 includes an off hook detector 75 connected to trunk lines 62. The off hook detector sends a signal to a digital data converter 71 which has a series of registers which store status information which can be read by the microcontroller 66. The off hook detector also includes a signal conditioner 74 which supplies a signal from trunk lines 62 to a Dual Tone Multi Frequency (DTMF) detector 73. The DTMF detector 73 detects DTMF tones in the signal from trunk lines 62 and sends the signal to the digital data converter 71. Trunk boards 61 also include a tone command register 78 which receives commands from microcontroller 66. A tone generator 76 generates a tone or other signal, such as a 420 HZ/12 DBM communication inhibiting/alert tone. When given a command from the tone command register 78, a tone relay 77 in turn applies the generated tone to the particular trunk line 62. Trunk boards 61 can each monitor up to 8 ground start or loop start PBX type trunks, or POTS (plain old telephone service), for hook status and DTMF dialed numbers. Dialed number DTMF detection is provided by 1 or 2 plug-on modules per trunk board 61, in 4 trunk increments. Each trunk board 61 is identical and provides microcontrollers 66 with on/off hook detection for each of up to 8 calls. Each trunk board 61 also provides a microcontroller interface for two DNC DTMF detection and tone alerting application modules.

Figure 13:
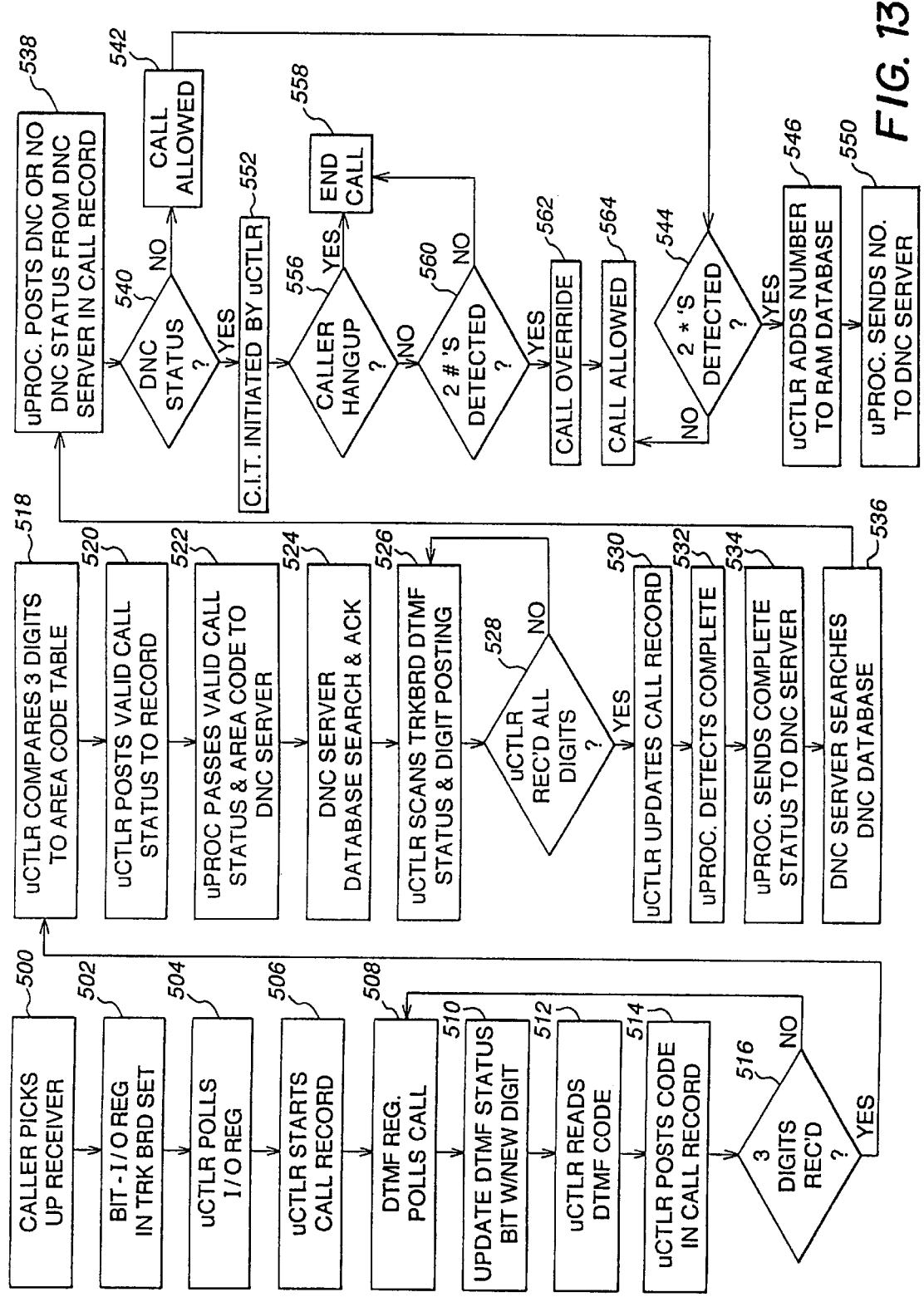
FIG. 13 is a flowchart describing how the analog monitoring unit operates.

The operation of the analog monitoring unit 52 described above in FIGS. 11 and 12 will be described now in conjunction with the flowchart in FIG. 13. When a customer picks up a receiver to place a call, step 500, the ring side voltage increases from approximately –48 V to greater than or equal to –40 V. This change is detected and a bit representing this trunk line's 62 hook status is set in a trunk board I/O register in the associated digital data converter 71 of off hook detector 75 in step 502.

The microcontroller 66 polls each I/O register every 10 ms, in step 504, and starts a call record for this call, in step 506, as well as starts polling registers of DTMF detector 73, in step 508, for this call. When a status bit of DTMF detector 73 posts a new digit received in step 510, the microcontroller 66 addresses that DTMF detector 73 and reads the 4-bit DTMF code in step 512 to post it in the call record, step 514.

In step 516, it is determined if three digits, corresponding to an area code, have been received. If all of the digits of the area code are not received, then the process returns to step 508, wherein the DTMF detector 73 continues to poll the line. After 3 digits are posted, the microcontroller 66 compares these digits in step 518 to its RAM based valid area codes table. In step 520, the microcontroller 66 posts a valid call status to the call record. The microprocessor 69 continuously scans call records, and when it recognizes the new call status, in step 522, it passes a new call status and its area code to the DNC server 56 (FIG. 4) e.g., via an RS232 link (serial line 67), so that the DNC server 56 can perform a search on the DNC database 58 in step 524. The DNC server 56 acknowledges receipt of the status and area code, in step 524.

The microcontroller 66 continues scanning the status of the trunk boards 61 and the DTMF digit code posting in step 526 until all digits are received. If the microcontroller 66 has received all of the digits for the phone number in step 528, then the microcontroller 66 posts the complete dialed number to the call record in step 530. The microprocessor 69 detects the complete status in step 532 and sends the complete number to the DNC server 56 in step 534. The DNC server 56 searches the DNC database 58 in step 536 for the dialed number and acknowledges with a DNC or non-DNC status to the microprocessor 69.

The microprocessor 69 posts the status of the phone number in the call record in step 538, and the microcontroller 66 reads the status. The status is checked in step 540. If the status is a DNC, the tone command register 78 receives a signal from microcontroller 66 in step 552. The tone relay 77 applies the tone generated by tone generator 76 to the trunk line 62. The tone generated is applied to the calling line until the calling party hangs up in step 556 and the call is ended in step 558, or until the override command (e.g., two "#"s) are detected and posted within 1 sec of each other in step 560, as posted and timed by the microcontroller 66 and detected by the trunk board 61. If two "#"s are detected, then the CIT or voice message ends due to the call override in step 562. The override command is stored in the database and call is allowed in step 564.

If the administrator status returned is non-DNC as determined in step 540, then the call is allowed uninterrupted by a CIT or voice message in step 542. In step 544, the line is monitored for the add-number command (two "*"s dialed within 1 second of each other). If they are detected, the microcontroller 66 posts a status of add-number-to-database, in the microcontroller 66 call record in step 546. The microprocessor 69 detects the status and sends it to the DNC server 56 to be added to the database 58 in step 550. The DNC server 56 then adds the dialed number to its DNC database 58. If two "*"s are not detected in step 544, then the call continues uninterrupted in step 564.

As one skilled in the art can recognize, there are numerous alternative embodiments which provide the same function as the above detailed description of an analog monitoring unit. One example embodiment of a digital monitoring unit will now be discussed.

Figure 14:
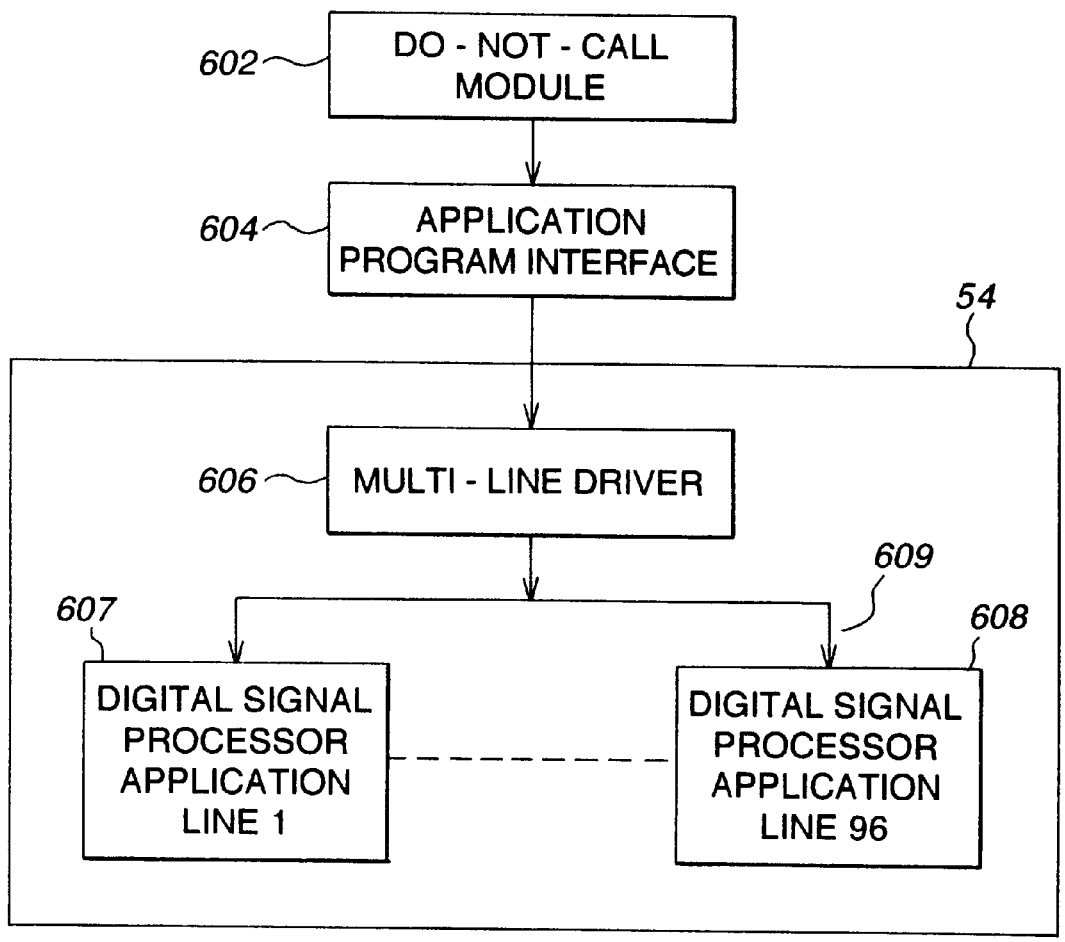
FIG. 14 is a block diagram illustrating the connection between hardware and software components in the digital monitoring unit.
Figure 15:
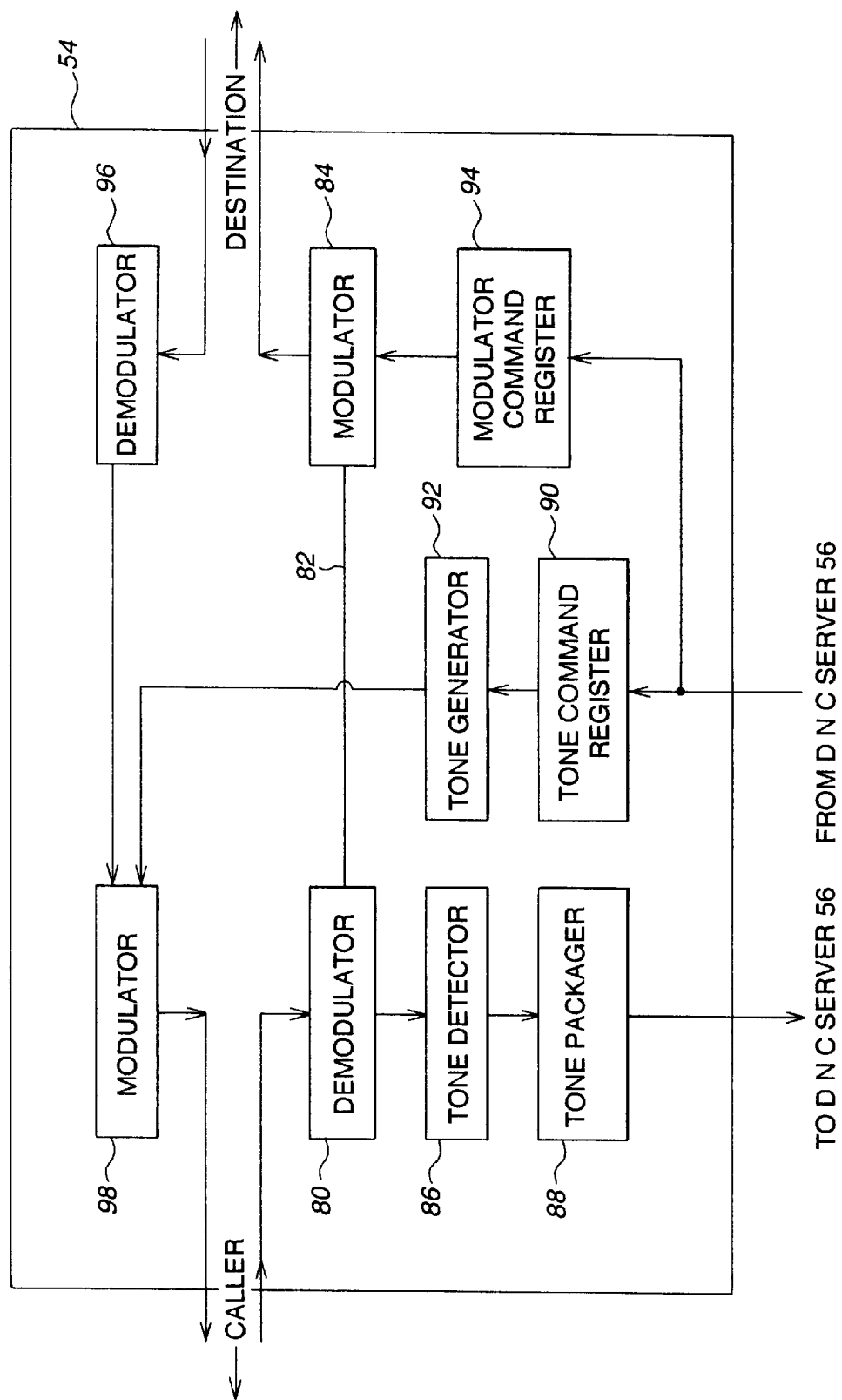
FIG. 15 is a block diagram illustrating more detail of a digital monitoring unit.

Referring to FIGS. 14 and 15, the digital monitoring unit 54 of the office control unit 48 will now be described. The block diagram in FIG. 14 illustrates the relationship between the hardware and software components in the digital monitoring unit 54 (FIG.4). This embodiment of the present invention uses a digital monitoring unit which utilizes distributed processing based on an OS/2 operating system and C++ development software, although other platforms may be used. The digital monitoring unit 54 uses a digital signal processor application 607, 608 for each line. The digital monitoring unit 54 also uses a Multi Vendor Integration Protocol (MVIP™) open architecture, standard telephony bus 609.

The digital monitoring unit 54 may be implemented, for example, using a Natural MicroSystems Alliance Generation™-48 or NMS AG™-24 board set. The AG™-24 or the AG™-48 board set contains all of the hardware and software modules needed to connect T1 carriers of up to 48 channels to an IBM-compatible PC. The AG™-24 and AG™-48 boards include a tone generator for generating the TI tone. There is one tone generator per channel or line. These AG™ boards may be used to implement digital signal processor applications 607, 608 in FIG. 14. These boards are accessed by the DNC module 602 through a Natural Micro-Systems™ API 604 and multi-line driver 606. The DNC module 602, for example, may perform the functions described above in connection with FIGS. 6–10.

The hardware includes a DTI-48, Digital Trunk Interface Board, which interfaces with up to wo T1 carriers with the PC, and one AG™-24 or AG™-48 board. The DTI-48 connects to the AG™-24 via an MVIP™ bus. In another embodiment, for primary rate ISDN lines, the DTI board may be replaced by a PRI-ISA48™ dual T1/ISDN controller manufactured by Primary Rate Incorporated. Other computer applications may also be used with the Natural Micro-Systems Alliance Generation™ -48 board set. Also, other boards with similar functions and utility may be used.

In FIG. 15, additional details of a typical digital monitoring unit 54 are shown. A demodulator 80 receives a signal from an originator line and demodulates it to provide a signal at the voice frequency. The signal is then passed to the modulator 84 via line 82, which regenerates the signal to the carrier frequency of the line and sends the modulated signal to the destination. The demodulator 80 also provides the demodulated signal to a tone detector 86. The tone detector 86 identifies the touch tones within the signal, provides a tone packager 88 which processes the detected tones into a message to be sent to the DNC server 56. In addition, in response to the DNC server 56, the tone command register 90 stores an indication of whether a CIT should be generated on the line. In response to the command in the tone command register 90, the tone generator 92 generates a signal which is applied to the modulator 98 which places the signal on the line. The modulator command register 94 stores an indication of whether to send a modulated signal to the destination. Modulator 98 receives a signal from demodulator 96 which demodulates signals from the destination. Modulator 84 sends the modulated signal to the destination.

The above description provides one skilled in the art with one example implementation of the digital monitoring unit. Alternative embodiments are possible in order to implement the digital monitoring unit.

Having now described the operation of the office control unit 48, the central administrator 18 and local administrator 50 (FIG. 1) will now be described in more detail. An administrator 18 or 50 is a computer system which provides standard database management capabilities and other database services for an entire entity. The database located in the central administrator 18 may be updated each night to reflect the prior day's activity of all of the offices within the entity using DNC services. The central processing administrator 18 automatically updates each office within the entity using the DNC services, with the information in the central master database. This allows information stored in the database, including any DNC input from any office, to affect all offices equipped with DNC services. Updating each office eliminates the need to maintain separate lists at each location. In addition, if the central administrator 18 is installed in an office which is serviced by an office control unit 48, then the central administrator 18 also performs the functions of a local office administrator 50. A local office administrator 50 may be installed in any office serviced by an office control unit 48. Office administrator 50 provides standard database management capabilities only for the local office in which it is installed. As another alternative design, an optional regional administrator 22 may be used. The regional administrator 22 performs the same functions as the central administrator 18, but provides services for a selected subgroup of offices.

Database management and query functions can be implemented using standard database techniques. Such useful functions include providing a display of yesterday's newly added DNC numbers and yesterday's DNC overrides. Also, the administrators may lookup DNC numbers added or overridden for any day during the last 31 days, lookup DNC numbers by area code or lookup any 10 digit number and display its' DNC status. The administrators have the ability to enter or remove DNC numbers from the Firm Master List and may display the Firm Master List. The administrators may also provide an originating Personal Identification Number (PIN), when it is utilized to access Service via a DNC Central Processing Hub and may also provide call summary reporting by PIN or Office. The administrators also may provide a connection for a printer for the printing of data and display screens.

In addition to the above capabilities, the administrators may also provide extended historical archival (beyond 31 days) of daily DNC activities by date. This may include providing origination, overriding and deletion activity of a specific number. The administrators may also record the time (of day), in addition to the date, of each DNC add, delete and override. The DNC Numbers, can also be tracked by the administrators according to originating entity, the Firm, or specific Regulating Agency. For an office serviced by it's own, on site, Office Control Unit, the administrators may provide the identity of an extension originating or overriding a DNC Number. The administrators may provide data by office and may provide an alert if a threshold number of overrides occur in a given office. The administrators may also be enabled to track certain DNC numbers to provide an alert if an override occurs.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A control device for selectively inhibiting communication between a communication device and a destination over a network, wherein the communication device is connected to the network by a communication medium, wherein the control device is connected to the communication medium and a database for storing identifiers of destinations and indicative of destinations for which communication is to be inhibited, wherein the communication device has an input mechanism, wherein the input mechanism is operative in response to a user to generate identifiers of destinations, wherein an identifier is sent over the communication medium to the network to initiate communication with a corresponding destination and wherein the input mechanism is operative in response to a user to generate an update signal sent over the communication medium, wherein the control device comprises:

means for detecting presence of an identifier sent over the communication medium to initiate communication with a corresponding destination;

means for performing a comparison of the detected identifier to identifiers stored in the database;

means for inhibiting communication between the communication device and the destination according to a result of the comparison made with the database and otherwise permitting communication between the communication device and the destination;

means for detecting presence of an update signal on the communication medium after permitting communication between the communication device and the destination, the update signal indicating that communication with the destination corresponding to the detected identifier should be inhibited; and means for modifying the database according to the detected identifier after the update signal is detected.

2. The control device as claimed in claim 1, wherein the result of the comparison indicates the identifier is not stored in the database.

3. The control device as claimed in claim 1, wherein the result of the comparison indicates the identifier is stored in the database.

4. A control device for selectively permitting communication between a communication device and a destination over a network, wherein the communication device is connected to the network by a communication medium, wherein the control device is connected to the communication medium and a database for storing identifiers of destinations and indicative of destinations for which communication is to be inhibited, wherein the communication device has an input mechanism, wherein the input mechanism is operative in response to a user to generate identifiers of destinations, wherein an identifier is sent over the communication medium to the network to initiate communication with a corresponding destination, and wherein the input mechanism is operative in response to a user to generate an override signal sent over the communication medium, wherein the control device comprises:

means for detecting presence of an identifier sent over the communication medium to initiate communication with a corresponding destination;

means for performing a comparison of the detected identifier to identifiers stored in the database;

means for temporarily inhibiting communication between a user of the communication device and a user at the destination after communication has been initiated according to a result of the comparison made with the network database;

means for detecting presence of an override signal on the communication medium after inhibiting communication between the communication device and the destination, the override signal indicating that communication with a destination corresponding to the detected identifier should be permitted; and means for permitting the communication between the communication device and the destination after the update signal is detected.

5. The control device of claim 4, wherein the means for temporarily inhibiting communication allows establishment of a communication connection between the communication device and the destination while inhibiting communication between the user of the communication device and the user at the destination.

6. The control device of claim 4, wherein the means for temporarily inhibiting includes means for applying an inhibiting signal to the communication medium and wherein means for permitting the communication includes means for removing the inhibiting signal.

7. The control device of claim 6, wherein the inhibiting signal includes at least one of a conversation inhibiting tone, a voice message or a software command.

8. The control device of claim 4, further comprising means for updating the database if the override signal is detected by adding to the database call override information corresponding to the detected identifier.

9. A process for selectively inhibiting communication between a communication device and a destination over a network, wherein the communication device is connected to the network by a communication medium, wherein the control device is connected to the communication medium and a database for storing identifiers of destinations and indicative of destinations for which communication is to be inhibited, wherein the communication device has an input mechanism, wherein the input mechanism is operative in response to a user to generate identifiers of destinations, wherein an identifier is sent over the communication medium to the network to initiate communication with a corresponding destination and wherein the input mechanism is operative in response to a user to generate an update signal sent over the communication medium, wherein the process comprises:

detecting presence of an identifier sent over the communication medium to initiate communication with a corresponding destination;

performing a comparison of the detected identifier to identifiers stored in the database;

inhibiting communication between the communication device and the destination according to a result of the comparison made with the database and otherwise permitting communication between the communication device and the destination;

detecting presence of an update signal on the communication medium after permitting communication between the communication device and the destination, the update signal indicating that communication with the destination corresponding to the detected identifier should be inhibited; and modifying the database according to the detected identifier after the update signal is detected.

* * * * *

UNITED STATES PATENT AND TRADEMARK OFFICE
CERTIFICATE OF CORRECTION

| | | |
|---|---|---|
| PATENT NO. | : 6,130,937 C1 | Page 1 of 1 |
| APPLICATION NO. | : 90/010978 | |
| DATED | : May 4, 2010 | |
| INVENTOR(S) | : Keith Alan Fotta | |

It is certified that error appears in the above-identified patent and that said Letters Patent is hereby corrected as shown below:

On the title page item (73), delete:

"Silicon Valley Bank"

and insert:

--Gryphon Networks Corp.--

Signed and Sealed this
Eighteenth Day of February, 2014

Michelle K. Lee
*Deputy Director of the United States Patent and Trademark Office*

US006130937C1

(12) EX PARTE REEXAMINATION CERTIFICATE (9495th)
United States Patent
Fotta

(10) Number: US 6,130,937 C1
(45) Certificate Issued: Jan. 25, 2013

(54) SYSTEM AND PROCESS FOR AUTOMATIC STORAGE, ENFORCEMENT AND OVERRIDE OF CONSUMER DO-NOT-CALL REQUESTS

(75) Inventor: Keith Alan Fotta, Duxbury, MA (US)

(73) Assignee: Silicon Valley Bank, Newton, MA (US)

Reexamination Request:
No. 90/010,978, May 4, 2010

Reexamination Certificate for:
Patent No.: 6,130,937
Issued: Oct. 10, 2000
Appl. No.: 08/853,563
Filed: May 8, 1997

(51) Int. Cl.
*H04M 3/38* (2006.01)
(52) U.S. Cl. .................. 379/200; 379/188; 379/196
(58) Field of Classification Search ............... None
See application file for complete search history.

(56) References Cited

To view the complete listing of prior art documents cited during the proceeding for Reexamination Control Number 90/010,978, please refer to the USPTO's public Patent Application Information Retrieval (PAIR) system under the Display References tab.

*Primary Examiner* — Scott L. Weaver

(57) ABSTRACT

A system and process for automatic storage, enforcement and override of consumer do-not-call (DNC) requests includes a control device for selectively blocking communication between a communication device and a destination over a communication medium. The control device is connected to the communication medium and to a database for storing identifiers of destinations for which communication is to be blocked. The communication device has an input mechanism responsive to a user to generate an identifier of the destination. The input mechanism is also responsive to an update signal indicating that the identifier should be added to the database or an override signal indicating that the blocked call should in fact, be permitted, thereby overriding the blocking mechanism. The communication device is automatically updated with information stored in the database which may be used by the communication device to process further communication.

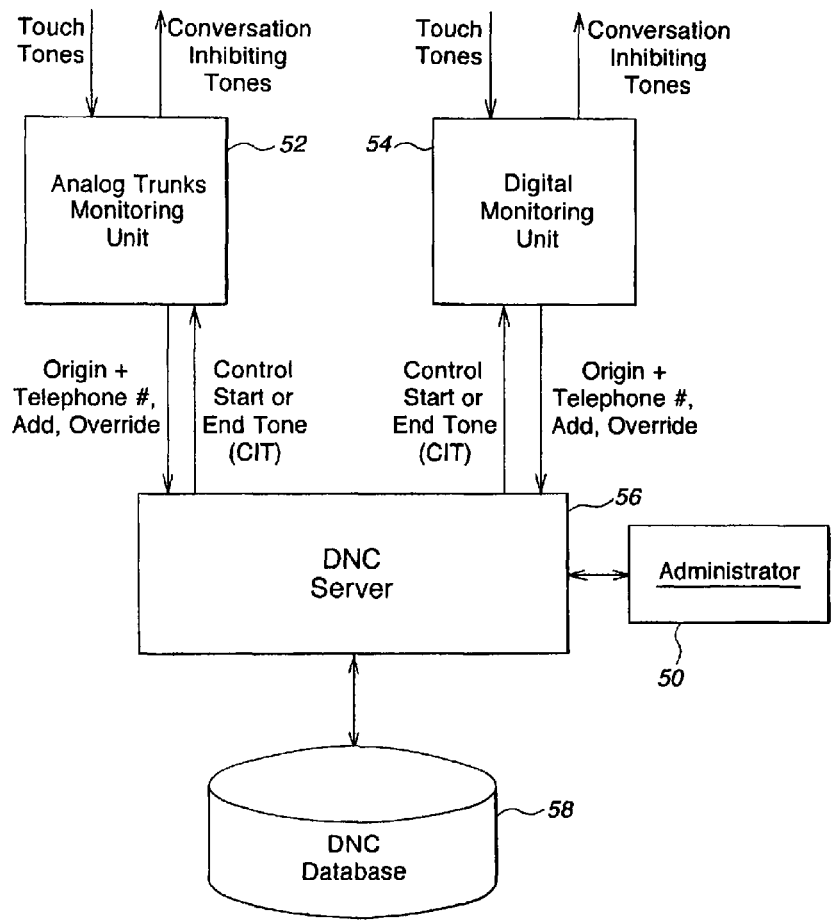

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 8 is confirmed.

Claims 4-7 are cancelled.

Claims 1 and 9 are determined to be patentable as amended.

Claims 2-3, dependent on an amended claim, are determined to be patentable.

1. A control device for selectively inhibiting communication between a communication device and a destination over a network, wherein the communication device is connected to the network by a communication medium, wherein the control device is connected to the communication medium and a database for storing identifiers of destinations and indicative of destinations for which communication is to be inhibited, wherein the communication device has an input mechanism, wherein the input mechanism is operative in response to a user to generate identifiers of destinations, wherein an identifier is sent over the communication medium to the network to initiate communication with a corresponding destination and wherein the input mechanism is operative in response to [a] *the* user to generate an update signal sent over the communication medium, wherein the control device comprises:

means for detecting presence of an identifier sent over the communication medium to initiate communication with a corresponding destination;

means for performing a comparison of the detected identifier to identifiers stored in the database;

means for inhibiting communication between the communication device and the destination according to a result of the comparison made with the database and otherwise permitting communication between the communication device and the destination;

means for detecting presence of [an] *the* update signal *generated by the input mechanism responsive to the user* on the communication medium after permitting communication between the communication device and the destination, the update signal indicating that communication with the destination corresponding to the detected identifier should be inhibited; and means for modifying the database according to the detected identifier after the update signal is detected.

9. A process for selectively inhibiting communication between a communication device and a destination over a network, wherein the communication device is connected to the network by a communication medium, wherein the control device is connected to the communication medium and a database for storing identifiers of destinations and indicative of destinations for which communication is to be inhibited, wherein the communication device has an input mechanism, wherein the input mechanism is operative in response to a user to generate identifiers of destinations, wherein an identifier is sent over the communication medium to the network to initiate communication with a corresponding destination and wherein the input mechanism is operative in response to [a] *the* user to generate an update signal sent over the communication medium, wherein the process comprises:

detecting presence of an identifier sent over the communication medium to initiate communication with a corresponding destination;

performing a comparison of the detected identifier to identifiers stored in the database;

inhibiting communication between the communication device and the destination according to a result of the comparison made with the database and otherwise permitting communication between the communication device and the destination;

detecting presence of [an] *the* update signal *generated by the input mechanism responsive to the user* on the communication medium after permitting communication between the communication device and the destination, the update signal indicating that communication with the destination corresponding to the detected identifier should be inhibited; and modifying the database according to the detected identifier after the update signal is detected.

\* \* \* \* \*